United States Patent
Schilling et al.

(10) Patent No.: US 9,302,675 B2
(45) Date of Patent: Apr. 5, 2016

(54) RADIO REMOTE CONTROL SYSTEM FOR CONTROLLING VEHICLE FUNCTIONS OF A MOTOR VEHICLE

(71) Applicant: Bayersiche Motoren Werke, Munich (DE)

(72) Inventors: Simon Schilling, Munich (DE); Joerg Bartelt, Amberg (DE); Matthias Kuntz, Munich (DE); Helmut Wagatha, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/468,768

(22) Filed: Aug. 26, 2014

(65) Prior Publication Data

US 2014/0365034 A1    Dec. 11, 2014

Related U.S. Application Data

(63) Continuation of application No. PCT/EP2013/053529, filed on Feb. 22, 2013.

(30) Foreign Application Priority Data

Feb. 27, 2012 (DE) .......................... 10 2012 202 934

(51) Int. Cl.
*G08C 17/00* (2006.01)
*G08C 17/02* (2006.01)
(Continued)

(52) U.S. Cl.
CPC ........... *B60W 50/00* (2013.01); *G07C 9/00182* (2013.01); *G08C 17/02* (2013.01); *G07C 2009/0023* (2013.01); *G07C 2009/00793* (2013.01); *G08C 2201/60* (2013.01)

(58) Field of Classification Search
USPC ............................ 701/2; 340/5.64–5.67, 10.1
See application file for complete search history.

(56) References Cited

U.S. PATENT DOCUMENTS

| | | | |
|---|---|---|---|
| 3,378,817 A | | 4/1968 | Vitt |
| 4,942,393 A | * | 7/1990 | Waraksa et al. ............... 340/5.62 |
| 5,319,364 A | * | 6/1994 | Waraksa et al. ............... 340/5.64 |

(Continued)

FOREIGN PATENT DOCUMENTS

| | | |
|---|---|---|
| DE | 103 46 888 A1 | 5/2005 |
| DE | 10 2006 010 170 A1 | 9/2006 |

(Continued)

OTHER PUBLICATIONS

International Search Report dated Apr. 2, 2013 (Two (2) pages).

(Continued)

*Primary Examiner* — Yonel Beaulieu
(74) *Attorney, Agent, or Firm* — Crowell & Moring LLP

(57) ABSTRACT

A radio remote control for controlling at least one first vehicle function that is relevant for functional safety, and further vehicle functions not related to functional safety. The remote control generates and wirelessly transmits transmission data to the vehicle for implementing the first vehicle function in response to a user input and a security information, provided upon actuation of a user interface and a security input actuator, respectively, by the user. In the case of a user input that is associated with the first vehicle function, the security information is only used to generate transmission data that causes the first vehicle function to be carried out if the security input actuator was actuated.

20 Claims, 7 Drawing Sheets

(51) Int. Cl.
　　　*B60W 50/00*　　(2006.01)
　　　*G07C 9/00*　　(2006.01)

(56) References Cited

U.S. PATENT DOCUMENTS

| | | | | |
|---|---|---|---|---|
| 5,412,379 | A | * | 5/1995 | Waraksa et al. .............. 340/5.26 |
| 5,515,036 | A | * | 5/1996 | Waraksa et al. ............. 340/12.11 |
| 6,034,617 | A | * | 3/2000 | Luebke et al. ............... 340/5.62 |
| 6,220,379 | B1 | | 4/2001 | Schugt et al. |
| 8,031,047 | B2 | * | 10/2011 | Skekloff et al. .............. 340/5.61 |
| 2003/0067443 | A1 | | 4/2003 | Hara et al. |
| 2011/0301795 | A1 | * | 12/2011 | Failing ............................ 701/22 |

FOREIGN PATENT DOCUMENTS

| | | |
|---|---|---|
| DE | 10 2005 039 531 A1 | 3/2007 |
| DE | 10 2008 051 982 A1 | 6/2009 |
| DE | 10 2009 041 587 A1 | 3/2011 |
| DE | 10 2010 005 327 A1 | 7/2011 |
| DE | 10 2011 084 366 A1 | 4/2013 |
| EP | 1 004 230 A2 | 5/2000 |

OTHER PUBLICATIONS

German-language Search Report dated Apr. 2, 2013, with Statement of Relevancy (Six (6) pages).

* cited by examiner

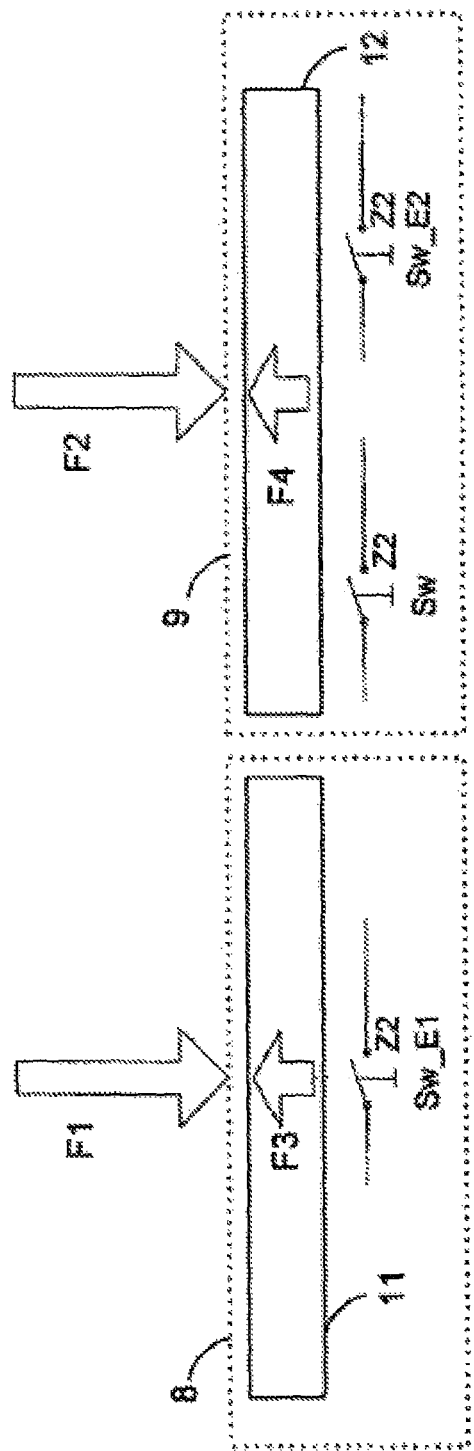

RADIO REMOTE CONTROL SYSTEM FOR CONTROLLING VEHICLE FUNCTIONS OF A MOTOR VEHICLE

CROSS REFERENCE TO RELATED APPLICATIONS

This application is a continuation of PCT International Application No. PCT/EP2013/053529, filed Feb. 22, 2013, which claims priority under 35 U.S.C. §119 from German Patent Application No. 10 2012 202 934.6, filed Feb. 27, 2012, the entire disclosures of which are herein expressly incorporated by reference.

BACKGROUND AND SUMMARY OF THE INVENTION

The invention relates to a radio remote control for controlling vehicle functions of a motor vehicle according to the preamble of claim 1.

Due to the possibility that, in German, the term "Sicherheit" within the meaning of the English term 'security' (access protection, protection from intruders, protection from data tampering, and the like) and "Sicherheit" within meaning of the English term 'safety' (protection from unreasonable risks to life and limb) could be mixed up, hereafter generally the term "security" is used in the first instance, and the term "operational safety" or "functional safety" is used in the second instance.

It is known to control individual vehicle systems that are not directly related to driving a vehicle by remote control (for example, integrated into the remote key fob of the vehicle). Examples of these include the access functions for the central locking system, the opening of the convertible top or the opening of the windows. In many vehicles, the remote key fob additionally includes a portion of the immobilizer. Moreover, further comfort functions, such as engine-independent air conditioning or auxiliary heating, can at times also be controlled by remote control. In contrast, moving the vehicle cannot be remotely controlled in the majority of cases.

For theft protection reasons, current remote key fobs generally incorporate the necessity of cryptographic protection. This is typically achieved by way of symmetric or asymmetric encryption/signing. Moreover, the radio link of such remote controls is safeguarded against tampering, for example by way of a checksum method, and more particularly by way of a cyclic redundancy check (CRC), or signatures. This can be useful both for robustness and for further increasing the security of transmission.

There are many functions in vehicles which are relevant for operational safety/functional safety. Such functions are developed and safeguarded, for example, in accordance with the standards IEC 61508 (IEC—International Electrotechnical Commission) or—in the automotive field—with ISO 26262 (ISO—International Organization for Standardization).

When remotely controlling functions in the vehicle which are relevant for operational safety/functional safety, requirements in regard to operational safety/functional safety (within the meaning of safety) exist for the entire remote control, in addition to the known requirements in regard to robustness and security (within the meaning of security).

For example, the erroneous activation of a remotely controlled function that is relevant for functional safety due to faults in the remote control (which is to say in the transmitter) must be sufficiently precluded or safeguarded against.

These requirements in terms of functional safety must be met, for example, by developing and safeguarding the entire remote control system (both on the transmitter side and on the receiver side) in keeping with ISO standard 26262 used in the automotive field.

This conventional approach to assuring functional safety, however, results in considerable complexity and additional problems, in particular for the remote control (which is to say the transmitter). For example, compared to simple remote key fobs, the software development process is very complex and the quantitative failure rates are considerably higher. Moreover, typical solutions that are used to assure functional safety, such as redundant processing of those input signals that are relevant for assuring the functional safety, are subject to tight limits in remote radio key controls due to the installation space and power consumption alone.

FIG. 1 shows a conventional transmitter/receiver system, which is used to remotely control a vehicle function. A remote control 1 comprises input means 2 for controlling the vehicle functions, for example various buttons for triggering different vehicle functions, such as a button for unlocking the vehicle and a button for locking the vehicle. A user input E is obtained by way of the input means 1. The user input E is converted by a transmitter logic controller 3 into the data S to be sent, containing the user input E in encoded form, which is to say S is a function of E: $S=f(E)$. For example, f(E) can involve simple encoding ($S=E$), or S—for security reasons, for example—contains further information such as the identification of the transmitter (transmitter ID) or checksums (for example within the meaning of a CRC) or sequence counter. The transmitter logic controller 3 is implemented by way of a microcontroller, for example, and optionally further electronics components. The modulation of the data to be sent on a corresponding radio frequency carrier is not shown in FIG. 1 for the sake of simplification. On the receiver side, the user input E is ascertained from the received data S after demodulation (not shown) in the evaluation logic controller 4, which is to say $E=f^{-1}(S)$, and the corresponding output signal A for carrying out the vehicle function that is associated with the user input is output.

In a vehicle function that is relevant for functional safety, such as a parking function triggerable from outside the vehicle for automatically maneuvering a passenger car into or out of parking space, all parts of the remote control that come in contact with the remote control unit of such a vehicle function must be designed in keeping with the specifications for functional safety in the case of a conventional approach. Consequently, this results in considerable added complexity, which cannot be accommodated, or is only very difficult to accommodate, with the given boundary conditions of the existing installation space and the power consumption. This applies in particular to the microcontroller used in the remote control.

It is the object of the invention to provide a radio remote control, which in addition to controlling vehicle functions (such as unlocking and locking the central locking system) that are not relevant for functional safety, also allows vehicle functions (such as automatic parking) that are relevant for functional safety to be controlled, without the requirements in connection with functional safety being essentially completely applied to the entire transmitter-side microcontroller.

The object is achieved by the features of the independent claims. Advantageous embodiments are described in the dependent claims.

The radio remote control according to the invention is used to control at least one first vehicle function that is relevant for functional safety, for example a function for carrying out an autonomous driving operation of a vehicle, and more particularly a parking function for the automated maneuvering of a passenger car into or out of a parking space. Preferably, it is a parking function for (forward and/or reverse) parking in a head parking space, and more particularly for parking in a forwardly drivable head parking space (such as in an individual garage). Such a parking function that can be controlled by remote control is described in the German patent application 10 2011 084 366.3 with the title "Remote control for a parking assistance system and a parking assistance system which can be controlled by remote control" by the same applicant, which was filed on Oct. 12, 2011. The description of the parking function and of the operation thereof described there is hereby included by reference in the disclosure of the present application.

In addition to one or more such functions, the remote control is also used to control further vehicle functions, for example for unlocking and locking the central locking system.

The remote control according to the invention comprises input means for the user selection of vehicle functions and for obtaining a user input corresponding to the selected vehicle function, as was already described in connection with FIG. 1. The input means are also used to select the first vehicle function, so that a user input associated with the first vehicle function is present upon selection of the first vehicle function. The input means are buttons, for example, wherein either each button is associated with exactly one vehicle function or, alternatively, one or more buttons are associated with more than one vehicle function. The remote control moreover comprises a transmitter logic controller for processing the user input, as was already described in connection with FIG. 1.

In contrast to conventional remote controls, however, the remote control according to the invention additionally comprises a certain security device for safeguarding the first vehicle function.

The security device itself comprises a security input means, which must be actuated for the first vehicle function to be carried out. The security input means is preferably transferred into a first state upon actuation, and remains in this state while the first vehicle function is being carried out. For example, it may be provided for this purpose that the remote control is configured in such a way that the security input means must be maintained in the first state by the user while the first vehicle function is being carried out, in particular by the user applying a force, such as by continuously actuating a button against a counter-force of the button, or by continuously holding a pulled-out operating part against a counter-force. It would also be conceivable that a (mechanical, for example) timing element is provided, wherein the timing element maintains the security input means (in the form of a button, for example) in the first state after one-time activation and then resets the same in a—preferably defined—time period. In this example, continuous actuation of the security input means by the user would be possible, but not necessarily required. For example, it would also be possible to use an electric or electronic timing element that is integrated into the security input means or connected downstream thereof, wherein the timing element maintains the button in the first state after activation and then resets the same after a, preferably defined, time period has lapsed.

The security input means can be a switch, which is switched by a force applied by the user. However, this is not essential. The security input means preferably has at least two different states and is actuated by an action of the user (for example, by pushing a button or touching a particular region on the remote control) and transferred into another state. The security input element is a switching element, for example.

The security device moreover comprises a security circuit, which is coupled to the security input means and includes security information. When the security input means is actuated, for example, the security information is enabled for processing.

The remote control is configured in such a way that, in the case of a user input associated with the first vehicle function, the security information is only used to generate transmission data that cause the first vehicle function to be carried out if the security input means has been actuated. In the case of a user input associated with the first vehicle function, the security information is preferably only used to generate transmission data that cause the first vehicle function to be carried if the first state of the security input means is present, and when the first state is left, the use of the security information for this purpose is precluded. Thus, only if the first state is present can such transmission data that allow the first vehicle function to be carried out be generated, using the security information (and preferably using the user input associated with the first vehicle function). The actuation of the security input means thus constitutes a security input by the user. During a subsequent change of the state of the security input means, the use of the security information is then disabled again.

According to the invention, undesired activation of the first vehicle function can be prevented by providing a secret in the form of the security information, which must be used in the generation of transmission data so as to receive valid transmission data for triggering the first vehicle function. The secret, which is to say the security information, should preferably be so complex that it can be excluded with sufficient likelihood that one element in the chain that encompasses the transmitter, transmission link, receiver and evaluation logic controller accidentally generates the secret—even in the event of a fault! The security information is preferably at least 16 bits long, and more particularly at least 32 bits long, for example, it is 16, 32, 64, 128 or 256 bits long.

The use of the secret for the generation of the transmission data must be activated on the transmitter side by a security input on the part of the user, this being by actuating the additional security input means. A check is carried out in the receiver whether the secret was used in the generation of the transmission data, and only in this case is the first vehicle function activated.

It is preferably provided that use of the security information for the generation of valid transmission data that cause the first vehicle function to be carried out is precluded when the first state is left. It is thus made possible for the first vehicle function to be safely deactivated as soon as the user cancels the security input. In the implementation of the remote control, it should be ensured—even in the event of a fault—with sufficient likelihood that the secret, which is to say the security information, is deactivated when the user cancels the security input and the security input means leaves the first state. In this case, it is established on the receiver side that the security information is no longer used to generate the transmission data, wherein the first function is suppressed from being further carried out. For example, the transmitter repeatedly sends corresponding data in a particular time pattern, such as every 10 ms, to the receiver for carrying out the first vehicle function. If after a certain time duration (for example, 100 ms) after valid data for carrying out the first vehicle function have been received, no valid data are received any longer, which were generated on the transmitter side using the security information, the first vehicle function is stopped from being further carried out, for example.

The threshold value for the above-described sufficient likelihoods depends on the security level of the first vehicle function. For example, the threshold value can be derived from specifications in the standards for functional safety; for example ISO 26262 proposes a value of smaller than/equal to 1-7 per operating hour for Automotive Safety Integrity Level C (ASIL C).

The proposed radio remote control allows control (such as activation and deactivation) with regard to the functional safety of sensitive vehicle functions, without the entire remote control having to comply with the corresponding requirements of the standard for functional safety. Instead, preferably only the security device (which is to say the security input means, the security circuit, and optionally further components of the security device) are developed and safeguarded in accordance with the specifications of the standard for functional safety. The complexity for developing and safeguarding the remote control is thus reduced, despite adherence to the standards for functional safety such as IEC 61508 or ISO 26262. Since it is not the entire transmitter-side scope, but only the security circuit that is developed and safeguarded according to the specifications of the respective standard, the approach proposed here results in a considerable cost reduction. In addition, however, the functional safety of the system also tends to be increased as compared to the traditional approach of safeguarding the entire transmitter, since the scope of the remote control that must in fact be safeguarded according to the respective standard is less complex. Moreover, independently from the functional safety, the robustness of the function also increases, since faulty activations, which even though potentially would not result in a true hazard, nonetheless represent undesirable behavior from the view of the user, can also be prevented.

The remote control preferably comprises a first button, which in turn comprises the security input means in the form of a security switching element.

According to a first embodiment variant for the first button, in addition to the security switching element, the first button can comprise a further switching element, which is used to obtain a user input that is associated with the first vehicle function. The further switching element is thus associated with the input means for the user selection of a vehicle function, while the security switching element is associated with the security device. The first button is then configured in such a way that upon actuation of the first button, both the security switching element and also the further switching element are actuated.

As an alternative, it may be provided that the remote control comprises at least one further button, in addition to the first button, and that the further button is used as an input means for selecting the first vehicle function.

As an alternative to the use of a button, wherein upon actuation of the button the security input means is actuated, it is also possible to use an entirely different concept in order to actuate the security input means. For example, it may be provided that the remote control comprises a main body and an operating part comprising at least one operating element. The at least one operating element is used to select the first vehicle function, for example for the autonomous parking of a vehicle. In a hidden state of the operating part, the at least one operating element of the operating part is hidden and cannot be operated. By a movement of the operating part in relation to the main body, in particular by pushing out, pulling out or folding the operating part, the operating part can be transferred from the hidden state into an open state of the operating part, in which the at least one operating element is visible and can be operated. Such a system comprising a main body and an operating part is described in the above-described German patent application 10 2011 084 366.3. The description of such a system and of the operating principle thereof described there is hereby included by reference in the disclosure of the present application.

A security input means is used in the present invention, wherein in this case the security input means is actuated by the movement of the operating part in relation to the main body and is brought into the first state, wherein in the open state it is then in the first state. For example, the security input means could be designed as a microswitch, wherein the microswitch is actuated, which is to say transferred into the first state, by the movement of the operating part in relation to the main body.

In a further implementation, the security input means could be designed as a reed relay, for example, wherein a magnet is brought closer to the reed relay by the movement of the operating part in relation to the main body, and the security input means is thus transferred into the first state.

For this purpose, it is preferably provided that the user must actively maintain the security input means in the first state by the user having to hold the operating part in the open state against a counter force (caused by a spring mechanism, for example) when the operating part is in the open state, since otherwise, without sufficient force application on the part of the user, the operating part returns again to the closed state due to the counter force, and the security input means leaves the first state again.

A second aspect of the invention relates to a receiver for an above-described remote control, the receiver being integrated into a motor vehicle. The receiver is configured to check the received data as to whether or not these were generated on the transmitter side, using the above-described security information.

A third aspect of the invention relates to a motor vehicle comprising an above-described receiver. The motor vehicle can be remotely controlled by way of an above-described remote control in such a way that at least one first vehicle function that is relevant for functional safety (for example, a parking function for the automated maneuvering into or out of a parking space) and one or more second vehicle functions (for example, an unlocking function and a locking function for a central locking system) can be triggered by the remote control. However, the first vehicle function is only carried out when it has been confirmed, based on the check carried out in the receiver, that the received data were generated on the transmitter side using the security information.

The invention will be described hereafter based on multiple exemplary embodiments with the aid of the accompanying drawings. In the drawings:

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 7 shows an exemplary embodiment for two buttons of the remote control.

DETAILED DESCRIPTION OF THE DRAWINGS

Figure 1:
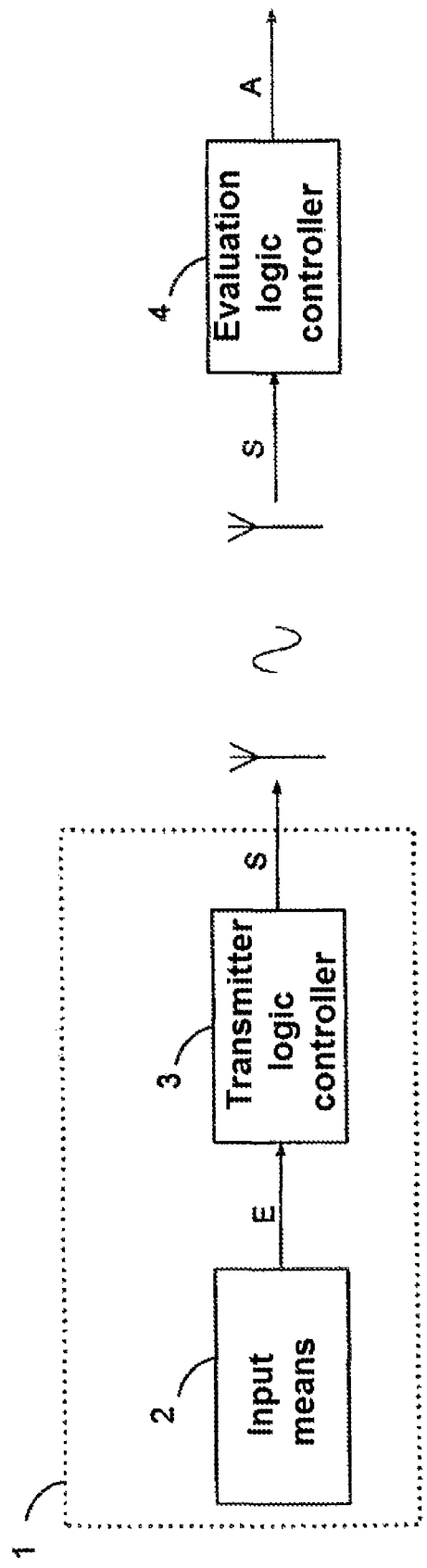
FIG. 1 shows a conventional transmitter/receiver system, which is used to remotely control a vehicle function.

The approach proposed here allows functionalities that are relevant for functional safety to be activated and deactivated by operating the remote key fob, without the requirements from the relevant standards for functional safety (such as ISO 26262) applying to the entire electronic system or even only to the microcontroller.

The following requirements for functional safety form the basis for the following exemplary embodiments of a remote control.

Analogously to the driver located in the vehicle, who has ultimate responsibility for driving the vehicle as a whole, the operator (which is to say the user) operating the remote control is to maintain ultimate responsibility over the remotely controlled functions. As a result, the first requirement reads: the system must prevent activation of a function that is relevant for functional safety in the absence of a request from the operator.

It is assumed that the deactivation of this function is a safe state. The second requirement therefore reads: the system must recognize the request of the operator to deactivate the remotely controlled function and implement this by assuming the safe state.

Since, in particular situations to be safeguarded, the operator no longer has the option of a mechanical intervention available, the system should additionally be designed so that uncontrolled maintenance of, or a switch to, an unsafe state is prevented in all situations, and more particularly also in the case of faulty operation by the operator. In case of doubt, the safe state is to be assumed. This is the third requirement.

The exemplary embodiments shown hereafter provide for the following to satisfy the first requirement for functional safety.

A secret is present in the remote control transmitter in the form of security information, the activation of which is expected by the receiver so as to activate the function that is relevant for functional safety. This secret should be so complex that it can be excluded with sufficient likelihood that one element in the chain that encompasses the transmitter, transmission link, receiver and evaluation logic controller accidentally generates the secret—even in the event of a fault. The secret is hidden in a security circuit as part of a security device, which is to say the secret is stored in the security device. The stringent specifications from the relevant standard for functional safety (such as ISO 26262) are only implemented for the security device, and not for the entire transmitter. This is an essential advantage of the invention. The use of the secret for the generation of a valid transmission signal for triggering the function to be safeguarded must be activated on the transmitter side by a security input on the part of the user, this being by actuation of the additional security input means. A check is carried out in the receiver as to whether the secret was used in the generation of the transmission data, and only in this case is the first vehicle function activated.

The exemplary embodiments shown hereafter provide for the following to satisfy the second requirement for functional safety.

The remote control transmitter comprises a mechanism that safely deactivates the function to be safeguarded as soon as the operator cancels the security input. It must be ensured—even in the event of a fault—with sufficient likelihood that the secret is deactivated when the operator cancels the security input. Canceling of the security input can take place, for example, by canceling a continuous actuation of the security input means (for example, when the security input means has been implemented by way of a button). In this case, it is established on the receiver side that the security information is no longer used to generate the transmission data, wherein then the function to be safeguarded is suppressed from being further carried out.

The exemplary embodiments shown hereafter provide for the following to satisfy the third requirement for functional safety.

The security input is designed on the transmitter side so that in typical situations of faulty operation—such as when the remote control has been dropped—the function to be safeguarded is deactivated if it previously was activated. Moreover, the security input should be designed on the transmitter side so that it can be excluded with sufficient likelihood in typical situations of faulty operation—for example when the transmitter is located in pant pockets and input occurs inadvertently—that the secret (which is to say the security information) is inadvertently activated.

Figure 2:
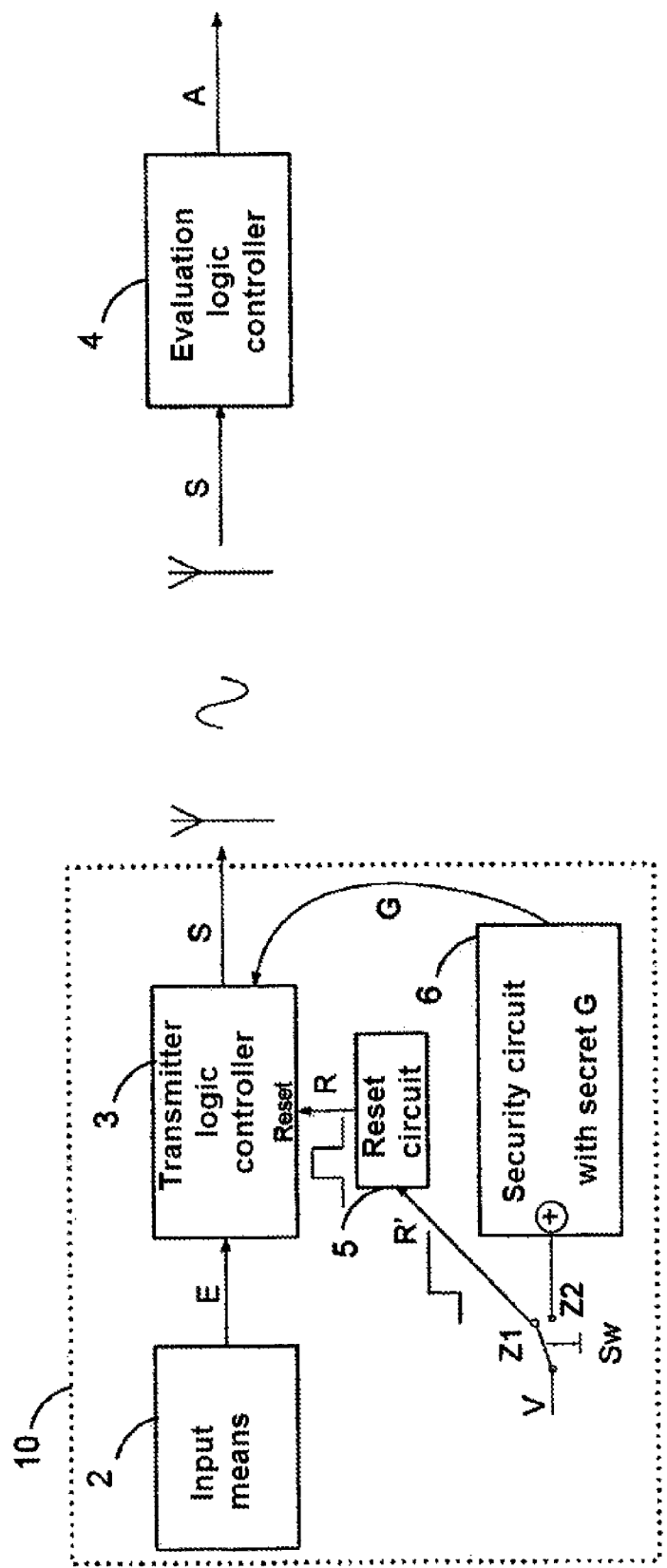
FIG. 2 shows a first exemplary embodiment for a remote control according to the invention.

FIG. 2 illustrates a first exemplary embodiment of a security device according to the invention. In addition to the remote control 1 of FIG. 1, the remote control 10 comprises a security device, which includes a security input means in the form of a security switching element Sw, a reset circuit 5 for the transmitter logic controller 5 and a security circuit 6. When the user makes an input that is not to be safeguarded (for unlocking or locking the central locking system, for example), the remote control 10 behaves identically to the remote control 1 of FIG. 1, since the security switching element Sw is not actuated, and the security switching element Sw is in switching state Z1. In this state Z1, the security circuit 6 is not active. "Not active" means that the security circuit 6 cannot provide any security information G, for example because the security circuit 6 is deactivated, in particular by deactivation of the operating voltage supply. When switching state Z1 is present and the security circuit 6 is not active, the transmitter logic controller 3 can send the transmission data S only without G, which is to say S=f(E). This can be recognized on the receiver side, and the receiver is only able to activate those functions (unlocking the central locking system, for example) which are addressed via user inputs that are not to be safeguarded.

The task of the security circuit 6 is to communicate initially unknown and sufficiently complex security information G, which is used to safeguard safety-relevant user inputs, to the transmitter logic controller 3. The security circuit 6 contains this security information G, which is to say the security information G is stored in the security circuit 6. The security circuit can be a (simple) memory. The security circuit can also be a more complex circuit, such as a microcontroller or an Application Specific Integrated Circuit (ASIC). The transmitter logic controller 3 and the security circuit 6 are preferably two different semi-conductor modules, wherein the security circuit 6 is safeguarded according to ISO 26262, however the transmitter logic controller 3 is not.

Figure 3:
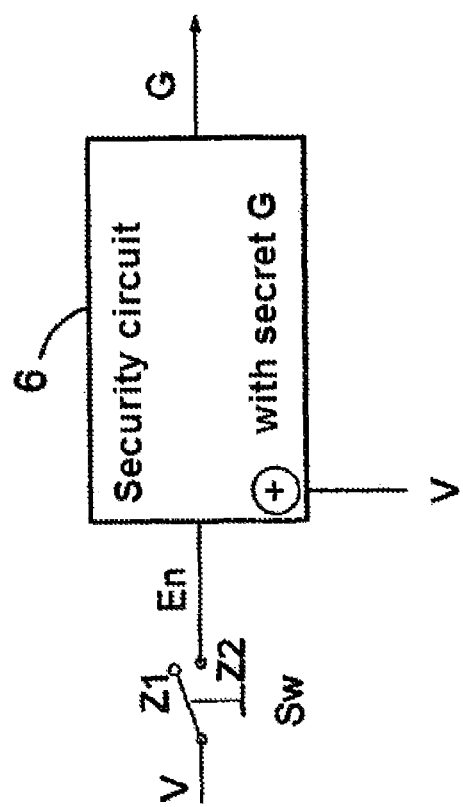
FIG. 3 shows an alternative circuiting of the security circuit.

The security circuit 6 is only active (which is to say it can only provide the security information 6) when the security switching element Sw is in switching state Z2. For this purpose, for example, the operating voltage supply V of the security circuit 6 can be routed over the security switching element Sw, wherein the security circuit 6 is only supplied with operating voltage V when it is in switching state Z2, and the security circuit 6 can supply the security information G at the output only in this case. As an alternative, an enable signal En (which here is an enable signal having the voltage level of the operating voltage V) could be applied to a corresponding enable input of the security circuit 6 by switching the security switching element Sw into switching state Z2, wherein in the case of En=V the security circuit 6 supplies the security information G at the output thereof. One example of this is illustrated in FIG. 3. Instead, a reset signal Rs could also be used, which is triggered when the security switching element Sw is switched back into switching state Z1, wherein in this case the data output of the security circuit 6 is reset to a predefined state for a certain duration, and no security information G is present at the output of the security circuit during this time duration.

Figure 4:
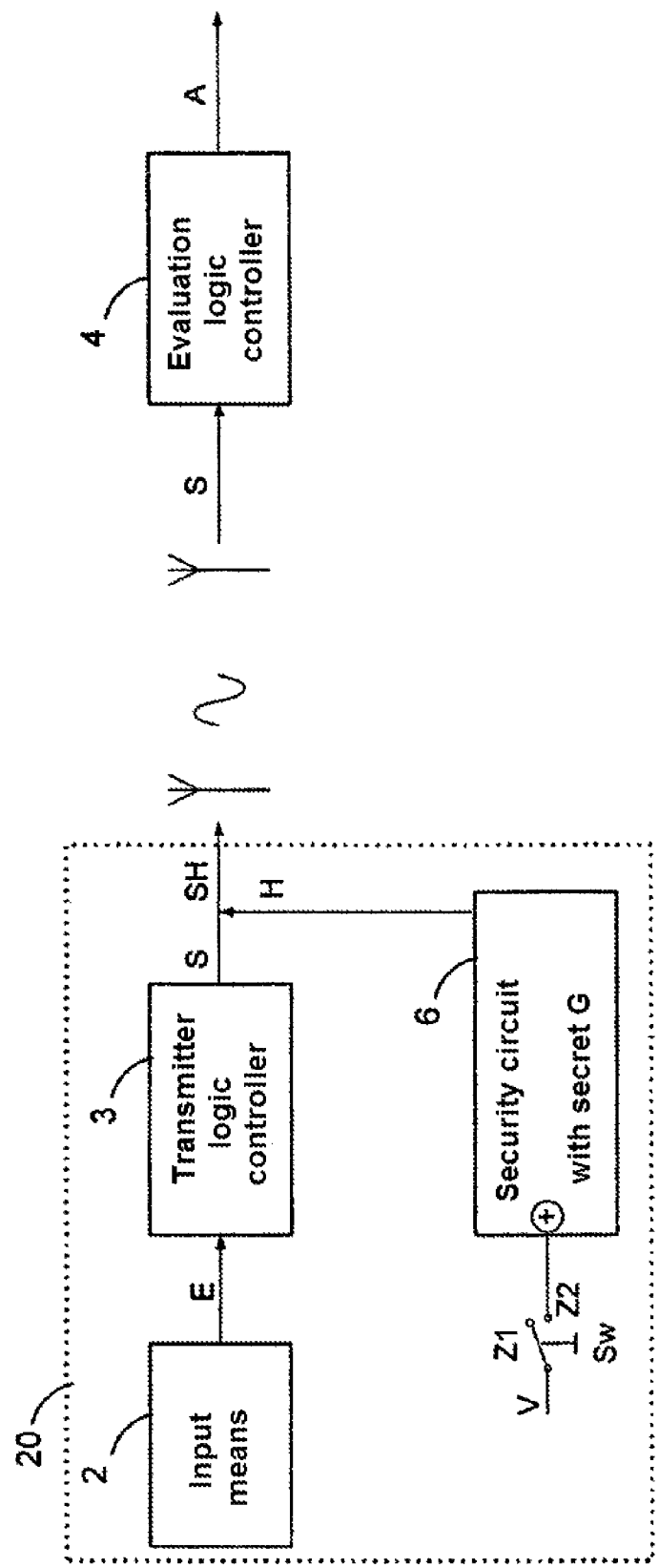
FIG. 4 shows a second exemplary embodiment for a remote control according to the invention.
Figure 5:
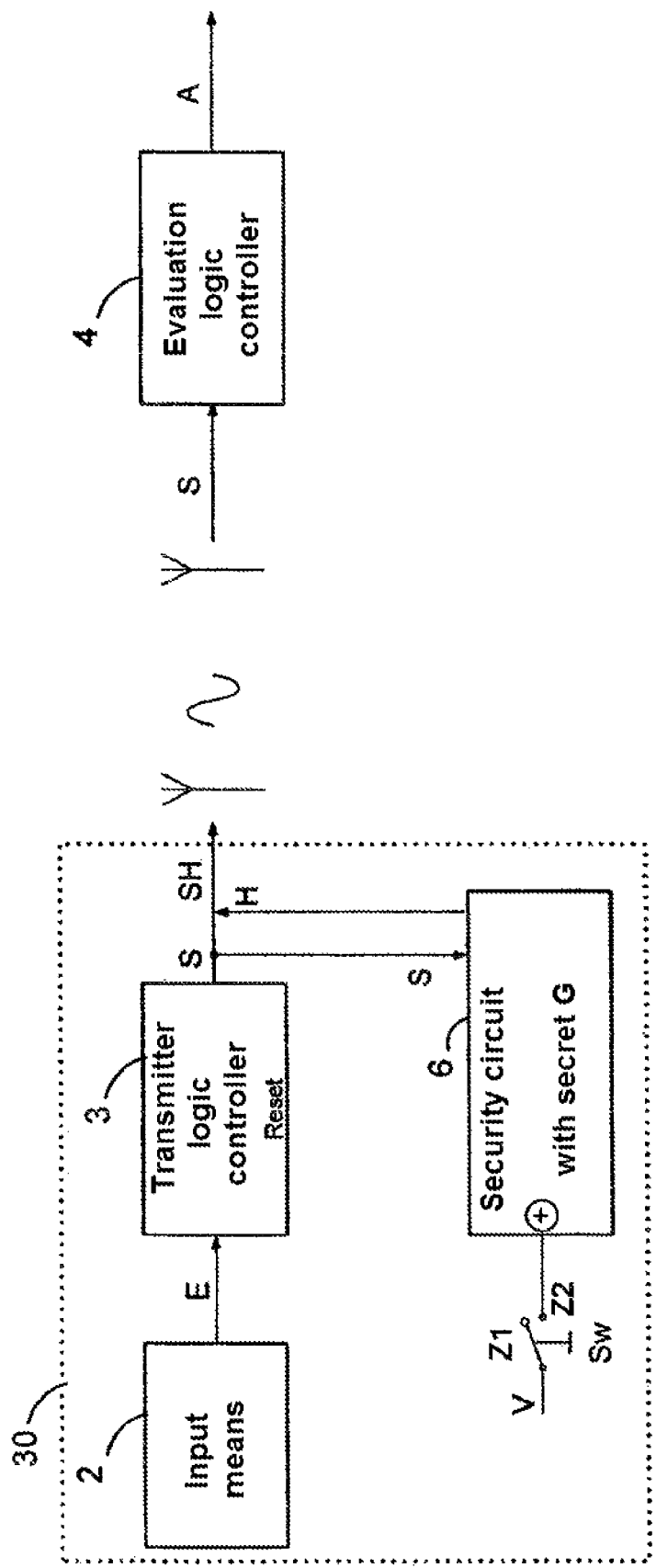
FIG. 5 shows a third exemplary embodiment for a remote control according to the invention.
Figure 6:
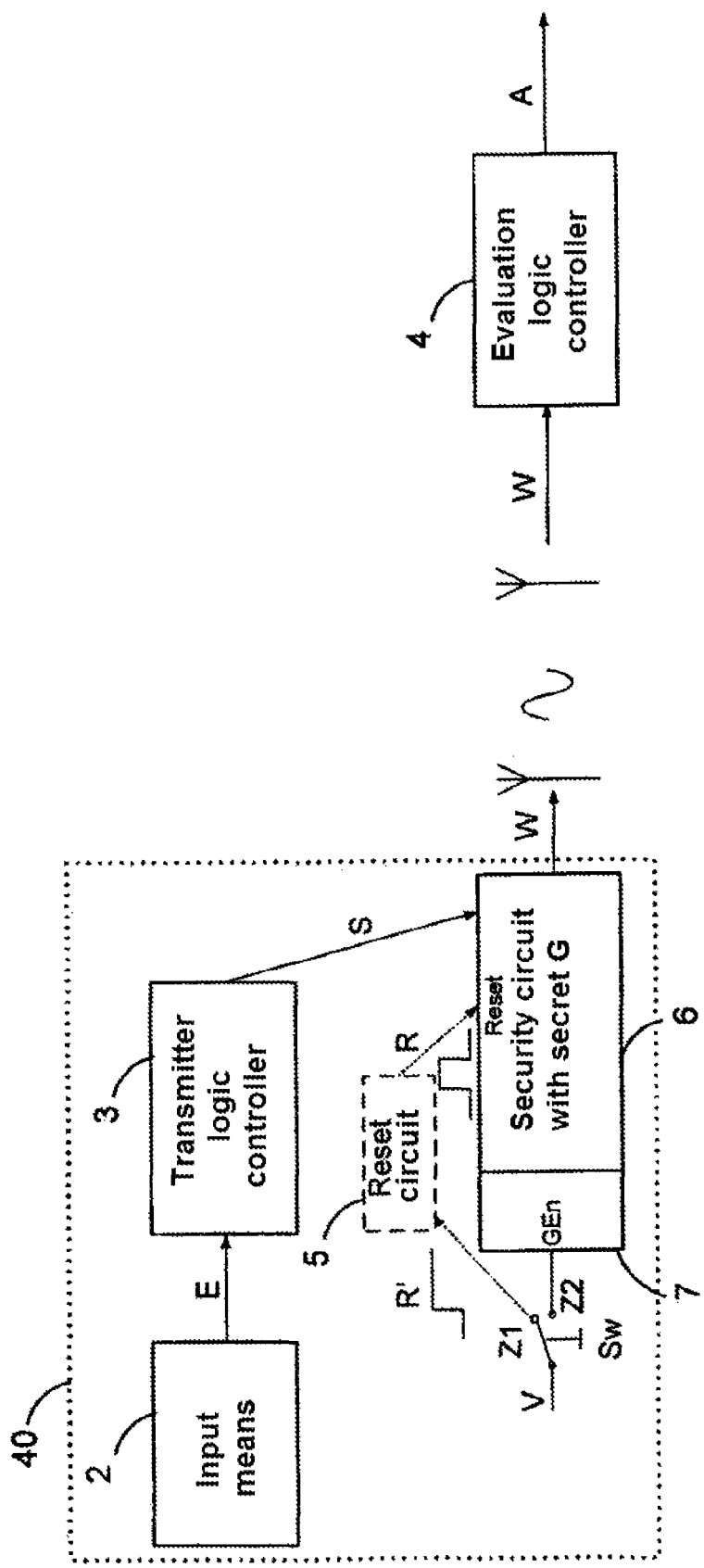
FIG. 6 shows a fourth exemplary embodiment for a remote control according to the invention.

These two variants can also be used in the case of the exemplary embodiments of FIG. 4 to FIG. 6.

Upon actuation of the security switching element Sw, the security switching element Sw is transferred into switching state Z2, so that the security circuit 6 becomes active and the security information G is activated for processing in the transmitter logic controller 3. The transmitter logic controller 3 then receives and knows the security information G, for example because the activated security circuit 6 sends the security information G to the transmitter logic controller 3, or because the transmitter logic controller 3 asks the security circuit 6 for the secret G. If the security circuit 6 is not active, the transmitter logic controller 6 does not know the secret G.

In the event of a user input that is to be safeguarded (for carrying out an autonomous parking function, for example), the user must make the corresponding input via the input means 2, so that a corresponding user input E is present, and must actuate the security switching element Sw, so that switching state Z2 is assumed. The security circuit 6 thus becomes active, and the transmitter logic controller 3 has the security information G at its disposal.

In this case, the user input E is converted into data S to be sent with the aid of the security information G. In other words: the transmission data S are generated using the security information G and the user input E, which is to say S=f(E,G), wherein the data S contain the user input E and G in encoded form, for example. Any function f(E,G) is suitable for this purpose, in particular provided that the following properties of encoding are met:

the complexity of G is preserved by the encoding;
a check is possible on the receiver side for use of the correct security information G in the generation of the transmission data S; and
the information about the user input E is preserved or can be reconstructed on the receiver side.

For example, the security information G could simply be attached to the user input E for forming the transmission data S, which is to say S=f(E,G)=E·G. For example, when the user input E is composed of the binary word 1010 and the security information G is composed of the binary word 10011001, the transmission S results as S=101010011001.

It is also possible to use more complex encoding for forming the transmission data S. For example, the user input E can also be assigned a checksum or a hash in the transmitter logic controller 3, such as a CRC checksum. So as to determine the CRC checksum, the security information G can represent the initial value (seed) of the CRC: S=f(E,G)=E ∘CRC(seed=G, datum=E).

Another form of more complex encoding is the use of the security information G as a cryptographic key, either in symmetric encryption or in asymmetric encryption. For example, when the Advanced Encryption Standard (AES) encryption method is used, the transmission data S could be determined in the following manner, for example: S=f(E,G)=AES (key=G, datum=E).

On the receiver side, the received data S are checked in the evaluation logic controller 4 as to whether these were generated on the transmitter side using the security information G. Depending on the function f(E, G) that is used, for this purpose either a check is carried out for security information G that is also known in the receiver (symmetric encryption), or a check is carried out by way of security information G' fitting the security information G in the case of asymmetric encryption. In the case of symmetric encryption, the receiver knows the security information G and how the transmission signal S=f(E,G) is composed. The evaluation logic controller 4 can thus check whether the received data S contain the correct G or, for example when the CRC is used, were calculated based on the correct security information G, and can reconstruct E. In the case of asymmetric encryption, the receiver knows the security information G' fitting the security information G and how S=f(E,G) is composed. Using a further function g(S,G') (optionally deviating from f(E,G)), the evaluation logic controller 4 can then check the correctness of the received data S and can thus reconstruct the user input E (similar to PGP encryption).

If the received data S were checked in the evaluation logic controller 4 as to whether these were generated on the transmitter side using the security information G, the reconstructed user input E is to be understood in the receiver as user input that is to be safeguarded and to be output as A. Otherwise, a fault is established on the receiver side, for example, or another useful reaction takes place, for example that only an action corresponding to user input that is not to be safeguarded is carried out. For example, an input button of the remote control 10 can have two assignments, these being a function that is not to be safeguarded (unlocking or locking the central locking system) and a function that is to be safeguarded (carrying out an autonomous parking process). If this input button and additionally the switching element S are actuated, the function to be safeguarded is triggered on the receiver side, while actuation of the input button without additional actuation of the switching element S causes the function that is not to be safeguarded to be triggered.

The remote control 10 preferably repeatedly sends corresponding data in a particular time pattern, such as every 10 ms, to the receiver. If after a certain time duration (for example, 100 ms) after valid data for carrying out the vehicle function to be safeguarded have been received, no valid data are received again, which were generated on the transmitter side using the security information G, the function to be safeguarded is stopped from being further carried out, for example. This applies in corresponding fashion also the following exemplary embodiments.

The remote control 10 is configured in such a way that the transmitter logic controller 3 loses the security information G again when the security switching element Sw leaves switching state Zs. A reset circuit 5 is preferably used for this purpose, which assures that the transmitter logic controller 3 reliably forgets the security information G again as soon as the security information G has been deactivated (switching from state Z2 to state Z1). The task of the reset circuit is, for example, to generate a reset pulse R for the transmitter logic controller 3 from the edge change of signal R' during the switch from state Z2 to state Z1. In the steady state (switching state Z1), the reset pulse has expired, which is to say the transmitter logic controller is not in the reset state, but is ready for operation. Nothing changes during a change in the state from Z1 to Z2. When a change from state Z2 back to state Z1 takes place, an edge change results on R', and the reset circuit 5 generates the reset pulse, which causes the transmitter logic controller 3 to switch to a reset state and to lose the security information G. As soon as the reset pulse R has expired, the steady state is reached again. The reset circuit should therefore preferably be designed so that the transmitter logic controller 3 reliably forgets the previously explicitly, or at least theoretically, (including in the event of a fault) known security information G with sufficient likelihood as soon as the security information G was deactivated by the switch of the security switching element Sw from Z2 to Z1. The resetting of the transmitter logic controller 3 can take place via an existing reset input of the transmitter logic controller 3, for example, if a reset thus triggered reliably erases or resets an internal memory of the transmitter logic controller 3 with sufficient likelihood, which could contain the security information G. As an alternative, the transmitter logic controller 3 can be reset, for example, by (temporarily) removing the operating voltage of the transmitter logic controller 3, for example when the transmitter logic controller 3 is configured with one or more volatile memories, which can contain the security information G.

FIG. 4 shows a second exemplary embodiment of the remote control 20. In the example shown in FIG. 4, the security circuit 6 generates the data H using the security information G, and the transmitter logic controller 3 generates the data S using the user input E, when the security switching element S is actuated. The data SH to be sent are derived from H and S, for example as a concatenation of H and S, or as a more complex function of H and S.

The procedures in FIG. 4 are similar to those described in FIG. 2, in particular the operating principle of the security switching element Sw. Reference is made to the description of FIG. 2 with regard to the aspects that need no description for FIG. 4. However, contrary to FIG. 2, FIG. 4 does not use the transmitter logic controller 3 and the security information G so as to generate the data S to be sent from G and the user input E. Instead, in FIG. 4 the security circuit 6 provides the data H, in addition to S, to the transmitter logic controller 3 for sending if the security circuit 6 was activated upon actuation of the security switching element Sw, for example by connecting the supply voltage V (alternatively, the activation/deactivation could also be controlled via the enable input or the reset input of the security circuit 6). In the simplest case, H=G and S=E can apply. Preferably one or both datum values H and S are encoded, which is to say H=f1(G) and S=f2(E). To this end, H and/or S can also contain further information, such as the identification of the transmitter (also referred to as the transmitter ID) or a checksum (CRC, for example), or a sequence counter.

The reset circuit 5 shown in FIG. 2 is not necessary in the security device of FIG. 4, since the transmitter logic controller 3 here never knows the security information G, and it is therefore not necessary for the transmitter logic controller 3 to reliably forget the security information G.

SH is sent in FIG. 4, which is derived from S and H, which is to say SH=f(S,H). For example, H and S can be sent correlated in term of time (for example as a concatenation SH=S·H or SH=H·S). For example, first the transmitter logic controller 3 sends S, and subsequently the security circuit 6 sends H. It is also conceivable that either H or S is sent less frequently than S or H when the data SH are transmitted repeatedly. For example, H can be sent less frequently than S so as to reduce the data volume. H can be sent periodically and independently from S. Moreover, it is possible for SH to result as a concatenation of alternating sub-segments of S and H, which is to say first a sub-segment of S, then a sub-segment of H, then again a sub-segment of S and so forth, for example.

On the receiver side, SH is checked for correctness (which is to say, whether SH was generated using the security information), and if successful, a corresponding output signal A is output so as to carry out the function to be safeguarded. The procedure is analogous to that described in FIG. 2. In this exemplary embodiment as well, the security circuit 6 is reliably deactivated when the security switching element is switched from switching state Z2 into switching state Z1, analogously to the procedure described for FIG. 2. If the security circuit 6 is deactivated, no valid H are generated any longer, or at least are no longer output by the security circuit 6, and thus only S and no SH are sent.

FIG. 5 shows a third exemplary embodiment of the remote control 30. In FIG. 5, the security circuit 6 generates the data H upon actuation of security switching element Sw, using the security information G and using the data S generated from E by the transmitter logic controller 3. As an alternative, it would also be conceivable that E is used directly for this, instead of S. The transmission data SH result from H, and optionally from S. It is possible for SH to be equal to H.

In FIG. 5, the procedures are similar to those described for FIG. 4. Reference is made to the descriptions of FIG. 2 and FIG. 4 with regard to the aspects that need no description for FIG. 5. In the example of FIG. 5, the security circuit 6 generates the data H using the security information G upon actuation of the security switching element Sw. In contrast to the example from FIG. 4, the security circuit 6 also uses the data S generated by the transmitter logic controller 3 for this purpose. It would also be conceivable to use the user input E instead. The transmission data SH to be sent result from H, and optionally from S, and the transmission data SH can in particular also correspond to H.

In the example shown in FIG. 5, the security circuit 6 includes both the security information G and the data S arriving from the transmitter logic controller 3 in the calculation of H, and then makes H available for sending if the security circuit 6 was activated upon actuation of the security switching means Sw. Thus, the following applies: H=f3(G,S). For example, the function f3 can be a checksum or encryption function, analogous to the examples that were described in connection with FIG. 2. The generation of the transmission data SH, and the checking and evaluation of the data SH on the receiver side, are done in the same as was already described in connection with FIG. 4. Likewise, this exemplary embodiment—as was already described in connection with FIG. 4—can also optionally use a reset circuit 5 (see dotted perimeter in FIG. 5). In this exemplary embodiment as well, the security circuit 6 is reliably deactivated when a switch occurs from switching state Z2 to switching state Z1, as was already described in connection with FIG. 2. No H can be generated when the security circuit 6 is deactivated, and thus only S, and no SH, can be sent.

Contrary to the variant shown in FIG. 4, the variant shown in FIG. 5 offers the advantage that H typically changes as a function of the signal S, and thus as a function of the user input E. This can offer advantages in terms of the transmission protocol. For example, it could be useful to provide various safeguards H for different user inputs E. For example, the "size" (such as number of bits) of H could be reduced for user inputs E that are less relevant for functional safety and that occur more frequently, as compared to user inputs E that are more relevant for functional safety and that occur less frequently, for example so as to save bandwidth in a radio transmission.

FIG. 6 shows a fifth exemplary embodiment of the remote control 40. Here, the security circuit 6 comprises means 7 for enabling the security information G in such a way that the security information is processed within the security circuit 6. The means 7 for enabling the security information G are coupled to the security switching element Sw via the input GEn in such a way that, upon actuation of the security switching element Sw, the security information G is enabled for processing within the security circuit 6. The security circuit 6 is configured to generate the transmission data W to be sent when the security information G has been enabled, using the security information G and using the data S generated by the transmitter logic controller 3.

An essential difference compared to the other exemplary embodiments is that the security circuit is not completely activated or deactivated by way of the security switching element Sw. If there is a user input E that is to be safeguarded (which is to say in switching state Z1), the security information G is enabled within the security circuit 6 if a corresponding signal is present at the input GEn in switching state Z1. If the security information G has been enabled, the security circuit 6 can calculate transmission data W from S using G, so that $W=f(S,G)$. If the security information G has not been enabled, the security information cannot use the security information G for this purpose, so that transmission data W are calculated according to $W=f(S)$. The transmission data W are then sent and evaluated on the receiver side (analogously to the case described in FIG. 4). When the security switching element Sw leaves switching state Z2 again, the security circuit 6 loses the enabled state for use of the security information G; the input GEn then no longer has the potential of the operating voltage V. So as to achieve a reliable reset of the security circuit G, in FIG. 6 preferably a reset is triggered during the change from switching state Z2 to the switching state Z1, analogously to the case described in FIG. 2 (by way of the reset circuit 5). However, this reset is for the portion of the security circuit 6 that is activated independently from the security switching element Sw.

The functional safety of the above-described approaches can optionally be increased by designing the security switching element Sw as a dead man's circuit. It is thus ensured that the system switches into a safe state in the event of a faulty operation, such as when the remote control is dropped or when slipping. For this purpose, the switching element must be designed so that the operator must actively maintain the switching element in switching state Z2 during the entire control process of a user input that is to be safeguarded, and more particularly by applying a force. For example, this can be brought about by continuously actuating a button comprising the security switching element Sw against a counter-force of the button, or by continuously holding a pulled-out operating part against a counter-force.

FIG. 7 shows two exemplary buttons 8 and 9 of a remote control. The button 8 is a button for activating a function not to be safeguarded, for example for unlocking the central locking system. The button 9 is a button for activating a function to be safeguarded, for example a function for a function for autonomously maneuvering into or out of a parking space.

The button 8 comprises a user interface 11 and the switching element Sw_E1. The switching element Sw_E1 is used as an input means for obtaining a user input E. When the switch 8 is actuated by pushing down on the user interface 11 using a force F1 that is greater than the counter-force F3 of the button 8, the switching element Sw_E1 is moved to switching state Z2 and a corresponding user input E is generated, which indicates the user selection of the function that is not to be safeguarded and which is converted into a corresponding transmission signal S by way of the transmitter logic controller 3. After the transmission signal S has been received, the function that is not to be safeguarded is triggered in the vehicle.

The button 9 comprises a user interface 12 and the switching element Sw_E2. Similarly to the switching element Sw_E1, the switching element Sw_E2 is used as an input means for obtaining a user input. When the switch 9 is actuated by a force F2 that is greater than the counter-force F4 of the button 9, the switching element Sw_E2 is actuated and moved to switching state Z2 and a corresponding user input E is generated, which indicates the user selection of the function to be safeguarded. The button 9 further comprises the security switching element Sw. Upon actuation of the button 9, not only the switching element Sw_E2 is actuated and moved to switching state Z2, but the security switching element Sw is also actuated and moved to switching state Z2. Only if the security switching element Sw is in switching state Z2 is the security information G used to generate transmission data S, which when received can cause the vehicle function that is to be safeguarded to be carried out at all.

Contrary to FIG. 7, it is also possible to use multiple security switching elements in addition to a single security switching element Sw, which must be actuated together so as to assure use of the security information and trigger the desired vehicle function. As an alternative, it is also possible to use multiple switching elements that must be actuated in a sequence, wherein the switching element to be actuated last corresponds to the above-described security switching element, for example. However, the other switching elements must then also be actuated in the predefined sequence for the function that is to be safeguarded to be triggered, using the security information. Here, at least the switching element actuated last remains in state Z2 when the function that is to be safeguarded is being carried out, wherein the process of carrying out the function that is to be safeguarded is aborted when state Z2 is left. Theoretically, it may also be provided that all or a subset of the switching elements to be switched in sequence must remain switched while the vehicle function that is to be safeguarded is being carried out, for example an operating part, which is coupled to a switching element and must be pulled out, thereby switching the switching element, and which must remain pulled out while the function is being carried out, and a lateral button, which is to be actuated after the operating part has been pulled out and which must be pushed and remain pushed while the function is being carried out.

In addition to, or in combination with, the security switching element Sw, a distinction can also be made in the user input E between inputs that are relevant for functional safety and inputs that are not relevant for functional safety. For example, simultaneous actuation of various buttons (or of other operating elements) of the input means can be necessary for E so as to generate an input E that is relevant for functional safety. Alternatively, sequential actuation of multiple buttons (or of multiple operating elements) can be necessary for E so as to generate an input E that is relevant for functional safety.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A radio remote control for controlling a first vehicle function of a vehicle that is relevant for functional safety and a second vehicle function of the vehicle that is not relevant for functional safety, the radio remote control comprising:
 a user interface configured to activate the first function and obtain user input corresponding to the first vehicle function to be activated;
 a transmitter logic controller for processing the user input; and
 a security device configured to safeguard the first vehicle function, the security device including:
  a security input actuator configured to be actuated in order for the first vehicle function to be carried out, and
  a security circuit coupled to the security input actuator and configured to include security information,
 wherein when the user input corresponding to the first vehicle function is obtained, the security information is only used for generating transmission data that causes the first vehicle function to be carried out if the security input actuator was actuated.

2. The radio remote control according to claim 1, wherein the security input actuator is transferred into a first state upon actuation, and remains in this first state while the first vehicle function is being carried out, and wherein the remote control is configured such that use of the security information for the generation of the transmission data is precluded when the first state is left.

3. The radio remote control according to claim 1, wherein the remote control is configured such that, upon actuation of the security input actuator, the transmission logic controller receives the security information and generates the transmission data using the security information and the user input associated with the first vehicle function.

4. The radio remote control according to claim 3, wherein the security input actuator is transferred into a first state upon actuation, and remains in this first state while the first vehicle function is being carried out, and wherein in the remote control is further configured such that use of the security information for the generation of the transmission data is precluded when the first state is left, and such that the transmitter logic controller loses the security information when the security input actuator leaves the first state.

5. The radio remote control according to claim 4, wherein the security device further comprises:
 a reset circuit that is coupled to the security input actuator and is configured to generate a reset pulse, wherein the transmitter logic controller loses the security information when the reset pulse is triggered.

6. The radio remote control according to claim 1, wherein the remote control is configured such that:
 the security circuit generates first data, using the security information, or provides the security information as first data upon actuation of the security input actuator;
 the transmitter logic controller generates second data using the user input that is associated with the first vehicle function, or the user input associated with the first vehicle function corresponds to the second data; and
 the transmission data result from the first data and the second data.

7. The radio remote control according to claim 1, wherein the remote control is configured such that:
 the security circuit generates first data, using the security information and using second data upon actuation of the security input actuator;
 the transmitter logic controller generates the second data using the user input that is associated with the first vehicle function, or the user input associated with the first vehicle function corresponds to the second data; and
 the transmission data to be sent results from at least one of the first data and the second data, or the transmission data corresponds to the first data.

8. The radio remote control according to claim 6, wherein:
 the security input actuator is transferred into a first state upon actuation, and remains in the first state while the first vehicle function is being carried out, the remote control is configured such that use of the security information for the generation of the transmission data is precluded when the first state is left, and the remote control is configured such that the security circuit no longer generates or outputs first data using the security information when the security input actuator leaves the first state.

9. The radio remote control according to claim 7, wherein:
 the security input actuator is transferred into a first state upon actuation, and remains in the first state while the first vehicle function is being carried out,
 the remote control is configured such that use of the security information for the generation of the transmission data is precluded when the first state is left, and
 the remote control is configured such that the security circuit no longer generates or outputs first data using the security information when the security input actuator leaves the first state.

10. The radio remote control according to claim 1, wherein
 the transmitter logic controller generates second data using the user input associated with the first vehicle function;
 the security circuit is coupled to the security input actuator such that the security information is enabled for processing within the security circuit upon actuation of the security input actuator; and
 the security circuit is configured to generate the transmission data to be sent when the security information has been enabled using the security information and using the second data.

11. The radio remote control according to claim 10, wherein
 the security input actuator is transferred into a first state upon actuation, and remains in this first state while the first vehicle function is being carried out;
 the remote control is configured such that use of the security information for the generation of the transmission data is precluded when the first state is left, and
 the remote control is configured such that the security circuit loses the enabled state for use of the security information when the security input actuator leaves the first state.

12. The radio remote control according to claim 1, wherein the security input actuator is a security switching element, and the remote control comprises a first button which includes the security switching element.

13. The radio remote control according to claim 12, wherein the first button, in addition to the security switching element, comprises a further switching element that is used to obtain the user input that is associated with the first vehicle function, wherein the first is configured such that both the security switching element and the further switching element are actuated upon actuation of the first button.

14. The radio remote control according to claim 12, wherein the remote control comprises at least one further button, in addition to the first button, and the further button is used as the user interface for activating the first vehicle function.

15. The radio remote control according to claim 1, wherein the remote control further comprises:
   a main body; and
   an operating part comprising at least one operating element, wherein the remote control is configured such that
      in a hidden state of the operating part, the at least one operating element of the operating part is hidden and cannot be operated,
      by movement of the operating part in relation to the main body, in particular by pushing out, pulling out or folding the operating part, the operating part can be transferred from the hidden state into an open state of the operating part, in which the at least one operating element is visible and can be operated, and
      the security input actuator is actuated by the movement of the operating part in relation to the main body.

16. The radio remote control according to claim 1, wherein
   the security input actuator is transferred into a first state upon actuation and remains in this first state while the first vehicle function is being carried out;
   the remote control is configured such that use of the security information for the generation of such transmission data is precluded when the first state is left; and
   the remote control is configured such that the security input actuator is to be maintained in the first state by the user while the first vehicle function is being carried out, in particular by the user applying a force.

17. The radio remote control according to claim 1, wherein the first vehicle function is a parking function for the automated maneuvering of a passenger car into or out of a parking space.

18. The radio remote control according to claim 1, wherein the security information is security information having a length of at least 16 bits.

19. A motor vehicle, comprising a receiver, wherein the receiver is configured to:
   receive the transmission data from the radio remote control according to claim 1;
   carry out the first vehicle function that is relevant for functional safety, and the one or more further second vehicle functions, in a remotely controllable manner; and
   only carry out the first vehicle function when it has been confirmed, based on a check carried out by the receiver, that the received transmission data was generated by the radio remote control using the security information.

20. A radio receiver configured to:
   receive the transmission data from the radio remote control according to claim 1;
   carry out the first vehicle function that is relevant for functional safety, and the one or more further second vehicle functions, in a remotely controllable manner; and
   only carry out the first vehicle function when it has been confirmed, based on a check carried out by the radio receiver, that the received transmission data was generated by the radio remote control using the security information.

* * * * *